Jan. 2, 1934. C. W. GARRISON 1,942,054
PROCESS OF PURIFYING A HYDROCARBON GAS AND A HYDROCARBON OIL
Filed March 17, 1930 2 Sheets-Sheet 1
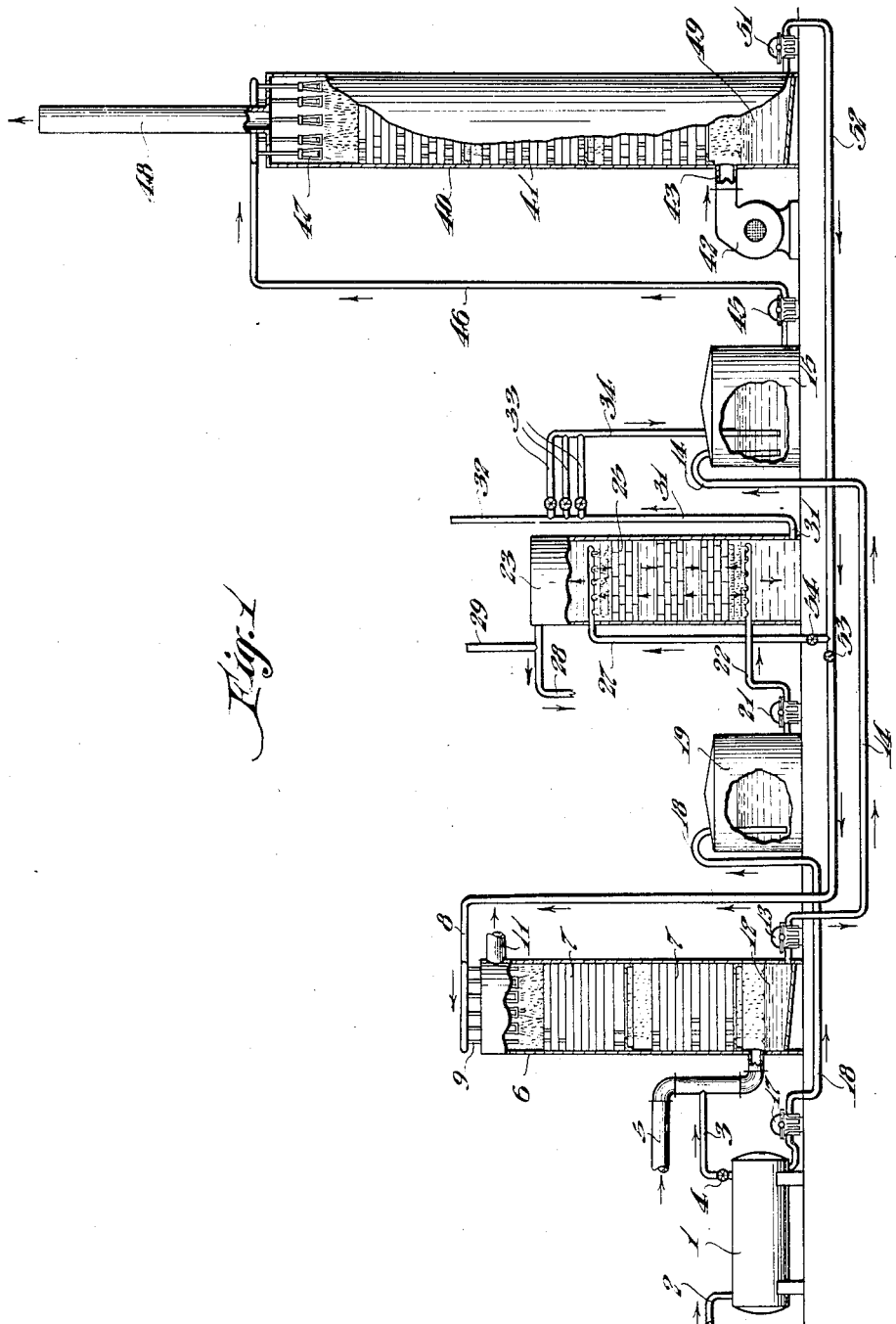
INVENTOR.
Clarence W. Garrison
BY
Jesse R. Langley
ATTORNEY.

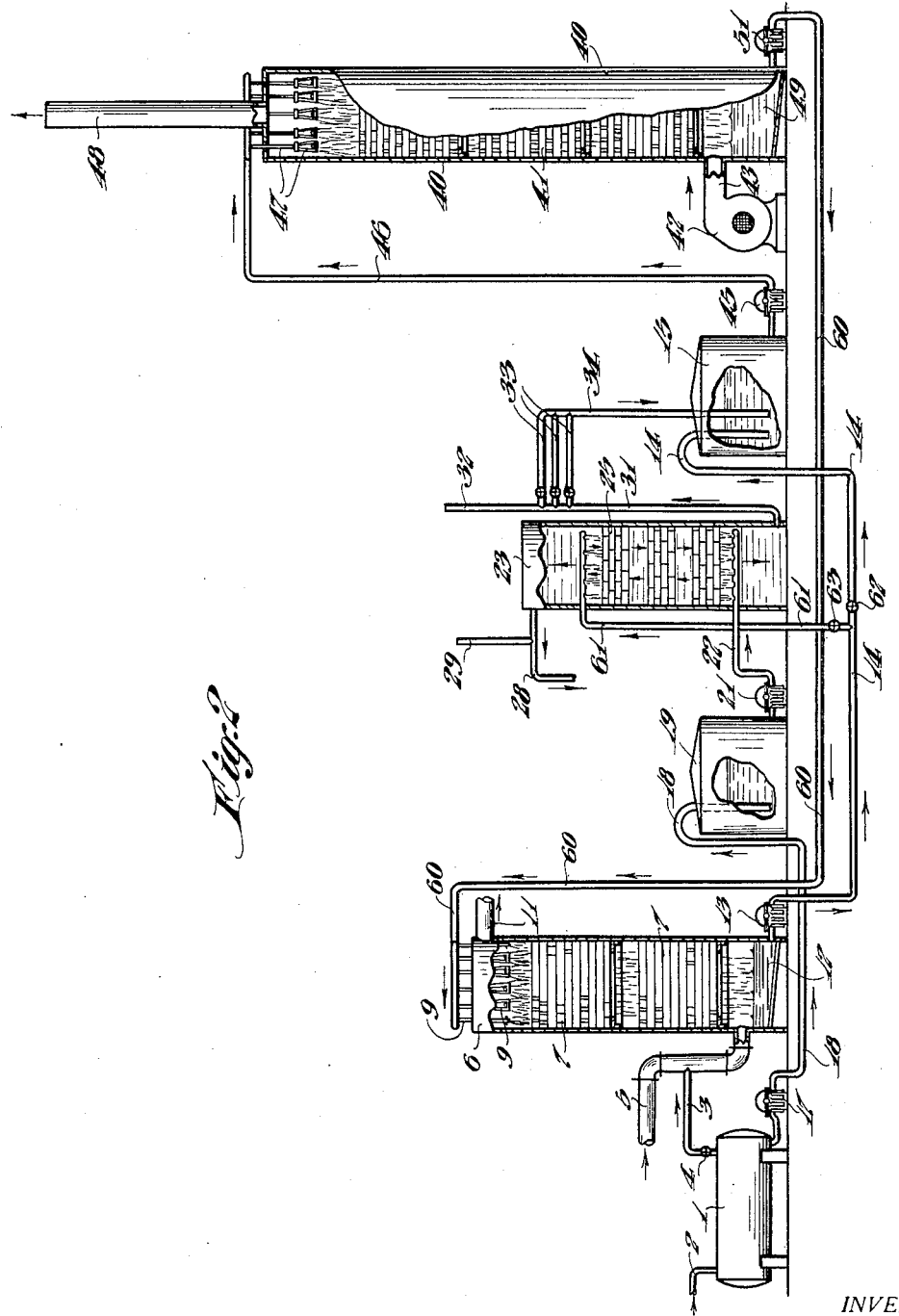

Patented Jan. 2, 1934

1,942,054

UNITED STATES PATENT OFFICE 1,942,054

PROCESS OF PURIFYING A HYDROCARBON GAS AND A HYDROCARBON OIL

Clarence W. Garrison, Fort Wayne, Ind., assignor to The Koppers Company of Delaware, a corporation of Delaware Application March 17, 1930. Serial No. 436,496

3 Claims. (Cl. 196—32)

My invention relates to the treatment of gases, for example, fuel gases such as coal gas, natural gas, refinery gas and the like, or air, and also to the treatment of oils such as petroleum, petroleum distillates, hydrocarbon oils obtained from natural gas, coal gas and similar sources, and more particularly to the removal from such gases and oils of sulphur impurities such, for example, as hydrogen sulphide and analogous substances.

My invention has an especial relation to the purification of petroleum distillates and especially the lighter distillates such, for example, as those resulting from pressure distillation or other cracking processes and of the more volatile or gaseous portions thereof.

An object of my invention is the provision of a process whereby the purification of a gas and of an oil may be advantageously combined.

A second object of my invention is to provide a process of purifying a gas and an oil by means of the same purifying liquid or portions thereof.

A further object of my invention is to provide a method whereby the simultaneous purification of both gas and oil may be effected in a substantially continuous and cyclic manner.

My invention has for further objects such other operative advantages and results as may hereinafter be found to obtain.

My invention contemplates the preferably substantially continuous washing of the gas and the oil to be purified in separate stages with a regenerable purifying liquid and the employment of actification apparatus common to both the gas purification system and the oil purification system.

My invention further contemplates carrying out the actification or regeneration of the recirculated liquor to such extent as to render said liquid capable of further use for either gas purification or oil purification.

My invention still further contemplates the recirculation of a regenerable purifying liquid through the gas and the oil in separate stages, preferably arranged in series with respect to at least a portion of the recirculated purifying liquid and preferably in the order named.

By "regenerable purifying liquid" is meant a liquid capable of absorbing hydrogen sulphide or analogous impurities from the gas and the oil in amounts sufficient to accomplish worthwhile purification of the same and of then being rendered capable of further use for the same purpose by treatment with air, heating, reaction with a substance having a greater affinity for hydrogen sulphide than the purifying liquid itself, or any other treatment which can be carried out substantially without interrupting the cycle of recirculation of the purifying liquid.

By "regeneration" is meant merely the renewal of at least a substantial portion of the original capacity of the liquid for absorption of the impurity or impurities the removal of which is desired, but not necessarily a re-creation of a compound or compounds originally present in the liquid or the return to the full original capacity of said liquid for absorbing said impurity.

I prefer to employ as the purifying liquid a solution containing a compound of an alkali-forming metal or radical such, for example, as sodium, potassium, calcium, magnesium or ammonium and of these I ordinarily prefer a compound of sodium as being the most advantageous with respect to the ultimate economy of the system.

Furthermore, I ordinarily prefer to employ a solution of sodium carbonate. A solution of sodium hydroxide itself may be used in the first instance, as for example, in starting up the process, but in this case it is necessary in order to regenerate or actify the solution to introduce carbon dioxide either as a gas or in solution, or some other acidic substance of about the same strength.

When employing a simple solution of sodium carbonate, for example, of from 1 to 6% alkalinity, the regeneration or actification after absorption of impurity from the oil treated may be accomplished by subjecting the solution to a current of a suitable gas such as air. In this instance, the reaction involved is a simple reversal of the absorption reaction and is brought about by the reduction of the partial pressure of hydrogen sulphide in the atmosphere adjacent to the solution, rather than by any reaction between the oxygen of the air and the solution, although some side reactions involving very small quantities of oxygen from the air may take place.

If a solution of caustic soda is employed in the first instance, it should be, as above set forth, regenerated at first in the presence of carbon dioxide but upon subsequent conversion of the active sodium into sodium carbonate or bicarbonate, further regeneration may be effected by means of a gas containing very little or no carbon dioxide, for example, air.

Other solutions may also be employed, for example, a solution prepared by dissolving sodium carbonate and arsenous oxide in water, or a suspension of a metallic compound such, for example, as ferric hydroxide or nickel sulphide in a solution of sodium carbonate. When such solutions are employed, the regeneration or actification involves the liberation of elemental sulphur and a different type of reaction than is the case when a simple sodium carbonate solution is used, and air or other gas containing free oxygen must in such instances be used in order to secure proper actification and regeneration, since the reactions taking place require oxygen from said air or other gas.

Moreover, in such instances it is ordinarily desirable to provide suitable means for substantially continuously removing the liberated sulphur, and in view of the fact mentioned above that the oxygen contained in the actifying gas itself enters into the actification reaction, it is also desirable to provide apparatus whereby the efficiency of introduction of the actifying gas to the solution is promoted. For example, means for introducing the gas in a finely-divided form to a body of the liquid to be actified may be employed, thereby also facilitating the removal of sulphur by flotation.

In any event, in order to achieve a continuous process capable of employment over extended periods of time, the extent of the actification or regeneration is such as to remove from the recirculated purifying liquid an amount of the impurity or impurities (either as such or in some other form) absorbed from the gas and from the oil at least equal to the amount continuously removed from the gas and the oil treated. This does not, however, preclude the building up in the initial stages of the process of a certain amount of dissolved hydrogen sulphide or other sulphur compound which thereafter remains in the purifying liquid throughout the entire cycle of recirculation.

In order that my invention may be fully set forth and understood, I now describe with reference to the accompanying drawings the preferred form and manner in which my invention is embodied and practiced. In these drawings, Figure 1 is a more or less diagrammatic view, partly in elevation and partly in vertical section, of apparatus for effecting the substantially continuous and cyclic purification of a gas and an oil by means of a regenerable purifying liquid; and Fig. 2 is a similar view of apparatus similar to that shown in Fig. 1 but differing therefrom in the arrangement of the several units.

Similar characters of reference designate similar parts in both of the views of the drawings.

While my invention in its broadest aspect is applicable to the purification of any gas and any oil containing impurities of the type described, my invention, as aforesaid, has a particular application to the purification of the lighter distillates from the pressure distillation of petroleum oils and similar processes.

The distillates recovered usually comprise a series of materials of varying degrees of volatility, so much so in fact that at atmospheric temperature and pressure or under the temperature and pressure at which the purification is carried out, constituents are present both in the gaseous or vapor phase and in the liquid phase. For convenience and by way of illustration the aforesaid drawings and the following description thereof relate especially to this advantageous application of my invention.

The apparatus shown in Fig. 1 comprises means for separately purifying the gas and the oil with portions of the same purifying liquid together with means for regenerating said portions in common.

Condensate from same pressure still or the like is introduced to a receiver 1 through a conduit 2 from which it is to be drawn for purification. The portions of the distillate which are so volatile as to enter the vapor phase when released from the pressure of the distillation operation to the pressure at which purification occurs are drawn off through a conduit 3 having a valve 4 and enter a gas conduit 5 through which are conveyed similar gases from other sources, or it may be entirely different gases.

In many cases the conditions of treatment are such that no such volatile constituents are evolved and the valve 4 may be closed or the conduit 3 dispensed with entirely.

The gases passing through the conduit 5 enter a gas purifying absorber 6 near the bottom thereof and pass upward through suitable contact material or packings 7 located therein. During the upward travel of the gases through the absorber 6 they are subjected to contact with a descending flow of purifying liquid introduced to the top of the absorber 6 through a conduit 8 and suitable sprays 9, and a purification of the gas from hydrogen sulphide or analogous impurity is thereby effected.

The gas which eventually reaches the top of the absorber 6 in purified form escapes therefrom through a conduit 11 and is conveyed away for whatever use is desired of it. The purifying liquid which reaches the bottom of the absorber 6 in a more or less fouled condition by reason of absorption of impurities from the gas, is temporarily accumulated in a sump 12 located at the bottom of the absorber 6 and is then drawn off by means of a pump 13 and forced through a conduit 14 into a suitable sump or tank 15.

The heavier or less volatile portions of the distillate or other oil in the receiver 1, or it may be the entire quantity of such oil, is preferably substantially continuously withdrawn by means of a pump 17 and delivered through a conduit 18 to a foul oil reservoir 19 from which it is in turn drawn by a pump 21 and forced through a conduit 22 into an oil washer 23. The oil reservoirs 19 and pump 21 may in many instances be omitted entirely, in which case the pump 17 delivers the oil directly to the oil washer 23.

The oil washer 23 may be of any suitable design but is shown in the present instance as constituting a vertical cylindrical chamber partially filled with loosely disposed contact media 25 such as tile or the like. As in the present instance it may be assumed that the oil being treated has a lower specific gravity than the purifying liquid employed, the conduit 22 which serves to convey the oil to the washer 23, is introduced at some point in the lower portion thereof but still somewhat removed from the bottom of the washer 23. For the same reason, the purifying liquid is conveyed to the washer 23 through a conduit 27 introduced to the washer 23 at some point in the upper portion thereof, but still somewhat removed from the top of the washer 23.

The oil, by reason of its lighter specific gravity, rises through the washer 23 countercurrent to the descending purifying liquid and is thereby purified, the oil then passing out of the top of the washer 23 through a conduit 28 having a vent 29 and being conveyed away for whatever further use is desired of it.

The purifying liquid having thus become at least partially fouled by the removal of impurities from the oil is withdrawn from the bottom of the washer 23 through a conduit 31 having a vent 32 and one of a plurality of valved offtakes 33 located at suitable levels with respect to the oil washer 23 and then passes through a conduit 34 into the fouled liquid tank 15 where it mingles with the fouled liquid from the gas purifying absorber 6.

In the present instance it is assumed that the purifying liquid employed is a simple alkaline solution of the type hereinabove described as requiring mere treatment with air or any other gas in sufficient volume to drive off the absorbed hydrogen sulphide therefrom for regeneration thereof. Accordingly in this instance there is provided an actifier 40 comprising a vertical cylindrical chamber filled with suitable contact devices 41 and supplied with air from a fan 42 through a conduit 43.

The fouled liquid from the tank 15 is delivered to the top of the actifier 40 by a pump 45 through a conduit 46 and suitable sprays 47 and passes downward through the actifier 40 countercurrent to the rising flow of air. In this manner a reversal of the absorption reaction is accomplished, impurities previously absorbed by the liquid from the gas and the oil being liberated and carried off by the actifier air which escapes through a suitable stack 48.

The thereby regenerated purifying liquid collecting in the bottom 49 of the actifier 40 is withdrawn by a pump 51 and delivered through a conduit 52 and conduits 8 and 27 to the absorber 6 and the washer 23, respectively. By means of valves 53 and 54 located in the conduits 8 and 27, respectively, the relative portions of purifying liquid passing to the absorber 6 and the washer 23 may readily be adjusted.

The purifying liquid employed in this instance may comprise a solution prepared by dissolving sodium carbonate in water in amounts sufficient to give a total alkalinity of 2%. Assuming that the gas to be purified contains 1% by volume of hydrogen sulphide there are required 80 gallons of this solution for each 1,000 cubic feet of the gas purified, and assuming that the oil to be purified contains 0.15% hydrogen sulphide there is required for the purification of this oil a volume of the purifying solution equal to or slightly less than the volume of the oil purified.

The portions of the solutions used for purification of the oil and of the gas after being combined are passed through the actifier as hereinabove described and regenerated by treatment with, for example, 150 cubic feet of air per gallon of solution recirculated and this solution is thereby rendered suitable for further purification of either the gas or the oil.

Referring to Fig. 2, it has been found that the employment of such a solution as I have described for the purification of oil works to best advantage if the purifying solution is preliminarily partially fouled by absorption of some of the same impurity to be removed from the oil. In order that this condition may be brought about and its beneficial effect fully realized, the apparatus shown in Fig. 2 may be employed.

In this instance the regenerated solution from the actifier 40 is delivered by the pump 51 through a conduit 60 and the sprays 9 to the gas purifying absorber 6 and a portion or all of the partially fouled solution leaving the absorber 6 is diverted from the conduit 14 and supplied to the oil washer 23 through a conduit 61, valves 62 and 63 being provided in conduits 14 and 61, respectively, for the purpose of making possible the regulation of the relative proportions of the solution traversing these conduits.

As the proportion of gas purified to oil purified may vary widely in different installations it is obvious that the relative amounts of solution employed for gas purification and for oil purification may vary equally widely, and in many cases it will be desirable to bypass some of the fouled solution from the gas purifying absorber around the oil washer, and vice versa, whereas in other instances the entire volume of the solution may be recirculated through both the gas purifying stage and the oil purifying stage.

During the continuance of the process mechanical losses which inevitably occur and side reactions which ordinarily take place, resulting in the consumption of sodium or its equivalent for the formation of inert side products, such as sodium thiosulphate, make it necessary to supply the recirculating liquid from time to time with fresh amounts of sodium carbonate or its equivalent. Similarly, portions of the recirculating solution may be discarded from time to time in order to limit the building up of inert materials in the recirculating system.

It will be obvious to those skilled in the art that numerous modifications may be made in the process and apparatus herein described without departing from the scope of my invention, and my invention is therefore not limited to the specific details or examples set forth hereinabove but may variously be employed and embodied within the scope of the claims hereinafter made.

I claim as my invention:

1. The process of purifying a hydrocarbon gas and a hydrocarbon oil from a sulphur impurity which comprises substantially continuously subjecting the gas to countercurrent contact with sodium carbonate solution to absorb all of the hydrogen sulphide therefrom that it is capable of and thereby preliminarily partially fouling it for the following oil treatment stage, subjecting the oil to contact with at least a substantial portion of said solution after its contact with said gas to effect further absorption of hydrogen sulphide in said portion, regenerating said solution and recirculating it for further purification of the gas and oil.

2. The process of purifying a hydrocarbon gas and a hydrocarbon oil from a sulphur impurity which comprises substantially continuously subjecting the gas to countercurrent contact with sodium carbonate solution to absorb all of the hydrogen sulphide therefrom that it is capable of and thereby preliminarily partially fouling it for the following oil treatment stage, then subjecting the oil to contact with at least a substantial portion of said solution after its contact with said gas to effect further absorption of hydrogen sulphide in said portion, regenerating said solution by treating it with a current of air, and recirculating it for further purification of the gas and oil.

3. The process of purifying a hydrocarbon gas and a hydrocarbon oil from sulphur impurity which comprises substantially continuously subjecting the gas to countercurrent contact with alkali carbonate solution to absorb all of the hydrogen sulphide therefrom that it is capable of and thereby preliminarily partially fouling it for the following oil treatment stage, then subjecting the oil to contact with at least a substantial portion of said solution after its contact with said gas to effect further absorption of hydrogen sulphide in said portion, regenerating said solution and recirculating it for further purification of the gas and oil.

CLARENCE W. GARRISON.